United States Patent
Gross et al.

[11] Patent Number: 5,964,874
[45] Date of Patent: Oct. 12, 1999

[54] SWAP SIZE DECREASE ON A UNIX BASED COMPUTER SYSTEM

[75] Inventors: Danny Brice Gross, Bastrop; Michael Douglas O'Donnell, Austin; Gene Regis Toomey, Kyle, all of Tex.

[73] Assignee: Advanced Micro Devices, Inc., Sunnyvale, Calif.

[21] Appl. No.: 08/841,513

[22] Filed: Apr. 23, 1997

[51] Int. Cl.⁶ .................................................. G06F 9/00
[52] U.S. Cl. .......................................................... 713/100
[58] Field of Search .............................. 395/652, 497.02, 395/182.13, 200.42, 842, 651, 653; 364/900; 713/1, 100

[56] References Cited

U.S. PATENT DOCUMENTS

| | | | |
|---|---|---|---|
| 4,855,903 | 8/1989 | Carleton et al. | 364/200 |
| 4,918,653 | 4/1990 | Johri et al. | 364/900 |
| 4,958,273 | 9/1990 | Anderson et al. | 364/200 |
| 5,155,837 | 10/1992 | Liu et al. | 395/500 |
| 5,155,847 | 10/1992 | Kirouac et al. | 395/600 |
| 5,276,867 | 1/1994 | Kenley et al. | 395/600 |
| 5,341,494 | 8/1994 | Thayer et al. | 395/425 |
| 5,454,103 | 9/1995 | Coverston et al. | 395/600 |
| 5,490,260 | 2/1996 | Miller et al. | 395/427 |
| 5,539,899 | 7/1996 | Huynh et al. | 395/497.02 |
| 5,574,851 | 11/1996 | Rathunde | 395/182.05 |
| 5,577,233 | 11/1996 | Goettelmann et al. | 395/500 |
| 5,627,995 | 5/1997 | Miller | 395/497.02 |
| 5,675,795 | 10/1997 | Rawson, III et al. | 395/652 |
| 5,678,042 | 10/1997 | Pisello et al. | 395/610 |
| 5,696,897 | 12/1997 | Dong | 395/182.13 |
| 5,696,968 | 12/1997 | Merkin | 395/652 |
| 5,701,516 | 12/1997 | Cheng et al. | 395/842 |
| 5,715,464 | 2/1998 | Crump et al. | 395/750 |
| 5,737,745 | 4/1998 | Matsumoto et al. | 711/114 |
| 5,771,354 | 6/1998 | Crawford | 395/200.59 |
| 5,778,395 | 7/1998 | Whiting et al. | 707/204 |
| 5,790,849 | 8/1998 | Crocker et al. | 395/652 |
| 5,802,297 | 9/1998 | Engquist | 395/200.42 |
| 5,805,903 | 7/1998 | Elkoury | 395/750.01 |
| 5,809,564 | 9/1998 | Craze et al. | 711/208 |

*Primary Examiner*—Dennis M. Butler
*Attorney, Agent, or Firm*—Skjerven, Morrill, MacPherson, Franklin & Friel LLP

[57] ABSTRACT

In a computer system operating under control of a UNIX type operating system, a primary swap space is decreased without reinstalling the operating system. The computer system includes a first storage device. The first storage device includes the primary swap space. The primary swap space has a first size. The method includes booting the computer system to a maintenance mode and activating the first storage device as an active storage device of the computer system if the first storage device is not already an active storage device of the computer system. The method further includes deactivating the primary swap space and activating the primary swap space at a second size smaller than the first size.

21 Claims, 3 Drawing Sheets

SWAP SIZE DECREASE ON A UNIX BASED COMPUTER SYSTEM

CROSS-REFERENCE TO RELATED APPLICATIONS

This application relates to co-pending application, Ser. No. 08/841,539 (Attorney Reference Number: M-4632 US), filed on the same day as the present application and, entitled "Root File System Size Increase on a UNIX Based Computer System", by Danny B. Gross, Michael D. O'Donnell and Gene R. Toomey, and which is incorporated herein by reference.

This application relates to co-pending application, Ser. No. 08/841,512 (Attorney Reference Number: M-4634 US), filed on the same day as the present application and, entitled "Primary Swap Size Increase on a UNIX Based Computer System", by Danny B. Gross, Michael D. O'Donnell and Gene R. Toomey, and which is incorporated herein by reference.

This application relates to co-pending application, Ser. No. 08/841,540 (Attorney Reference Number: M-4635 US), filed on the same day as the present application and, entitled "Root Size Decrease on a UNIX Based Computer System", by Danny B. Gross, Michael D. O'Donnell and Gene R. Toomey, and which is incorporated herein by reference.

BACKGROUND

1. Field of Use

This invention relates to computer systems and, more particularly, to methods of decreasing the size of swap space on UNIX type operating system based computer systems.

2. Description of the Related Art

Computer systems are information handling systems which can be designed to give independent computing power to one user or a plurality of users. Computer systems have attained widespread use in providing computer power to many businesses and institutions. Some important applications in which computer systems have become common include manufacturing monitoring and control; electrical, mechanical, and chemical system design and simulation; and network management and service. Productive processing time is of great importance to the users of these computer applications because system down time can result in significant costs.

Computer systems are designed to provide a degree of system availability that is necessitated by the applications for which the computer system is intended. System availability ranges from the ability of a system to remain functional in spite of failures in a portion thereof, to the minimization of a system's down-time in the event of a failure or necessary upgrade. High availability (HA) computer systems, as their name implies, are required to be available, or "on," virtually all of the time. For example, because many computer applications involve the use of network servers to provide processing power to multiple users, it is important that the network server be available as much as possible. Such computer systems (or networks of such computer systems) should be capable of being upgraded with minimal system down time.

High availability computer systems must be able to restart as soon as possible after a system upgrade. System upgrades or patches are often necessitated by the establishment of new system requirements. Unfortunately, performing a system upgrade such as resizing the swap space on a UNIX based computer system typically requires that the computer system be powered down or turned off, and that the operating system be reinstalled with the required changes.

Commonly, when a computer system requires an upgrade, patches are made to the operating system of the computer system. Often, new patches are added to the patches from a previous system upgrade resulting in a large number of patches for each successive upgrade. The successful patches are then updated to other computer systems by replacing the present operating system of those computer systems with the new operating system including the successful patches. The new operating system is often installed from a storage device such as a tape drive to directly replace the present operating system needing the upgrade. Alternatively, the new operating system can be downloaded over a network.

Use of the method set forth above has certain consequences. Notably, using this method usually requires that the computer system be shut down. A backup of the present operating system usually must be made, and the upgrades or patches must be loaded while the computer system is down. Additionally, upgrades must often be made for multiple computer systems, causing down-time for all the systems involved. For example, in a network of servers, each server must be upgraded individually. That is, the system manager must power down a server, thereby limiting server availability by preventing user access, make a backup of the present operating system, load the new operating system, and test the new operating system. The system manager then repeats these actions for each of the other servers. The computer system being upgraded is usually down throughout the procedure, possibly for a period of hours. The cost for system downtime during these upgrades can be significant. Also, the chances for error or failure can be significant with this practice.

An alternative method allows upgrading a computer system while the computer system is operating. An operating system may be upgraded by selecting and preparing a new boot device while the computer system is functioning, loading the new operating system onto the new boot device while the computer system is functioning, and rebooting the computer system using the new boot device. Such a method of upgrading computer systems is disclosed in U.S. patent application Ser. No. 08785,491, attorney docket No. M-4525 US, filed on Jan. 17, 1997, entitled "Installing Operating Systems Changes on a Computer System," naming Danny B. Gross, Michael D. O'Donnell and Gene R. Toomey as inventors.

SUMMARY

It has been discovered that a computer system may be upgraded by decreasing the size of the computer system's swap space without having to reinstall the operating system on the computer system or preparing an alternate boot device within the computer system. Such a procedure advantageously allows the system to be upgraded while minimizing the system's resulting down time, the potential errors during operating system reinstallation, and the resources required for a system upgrade. Thus, the reliability and efficiency of making upgrades is improved with a simplified upgrade procedure that also reduces costs resulting from system upgrades requiring swap space decreases.

In one embodiment of the invention, A computer system operates under control of a UNIX type operating system. A primary swap space of the computer system is decreased without reinstalling the operating system. The computer system includes a first storage device. The first storage device includes the primary swap space. The primary swap space has a first size. The method includes booting the computer system to a maintenance mode and activating the first storage device as an active storage device of the computer system if the first storage device is not already an active storage device of the computer system. The method further includes deactivating the primary swap space and activating the primary swap space at a second size smaller than the first size.

Another embodiment of the invention relates to an apparatus for decreasing the size of a primary swap space on a first computer system operating under control of a UNIX type operating system. The apparatus includes a computer-readable storage medium and an upgrade module stored on the computer-readable storage medium. The upgrade module is for upgrading the first computer system by decreasing the size of the primary swap space on the first computer system without reinstalling the operating system. The upgrade module upgrades the first computer system responsive to being accessed by a second computer system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the preferred embodiments. The description is intended to be illustrative of the invention and should not be taken to be limiting. Many variations, modifications, additions, and improvements may fall within the scope of the invention as defined in the claims which follow.

In one embodiment, a computer system is upgraded to decrease the size of the swap space. The computer system is rebooted to single user mode. The root volume group is activated and the swap logical volume is removed. A new swap logical volume is created with the appropriate size, and the new logical volume is logically connected with the swap path. The computer system is rebooted to bring the computer system on line with the smaller swap space.

Figure 1:
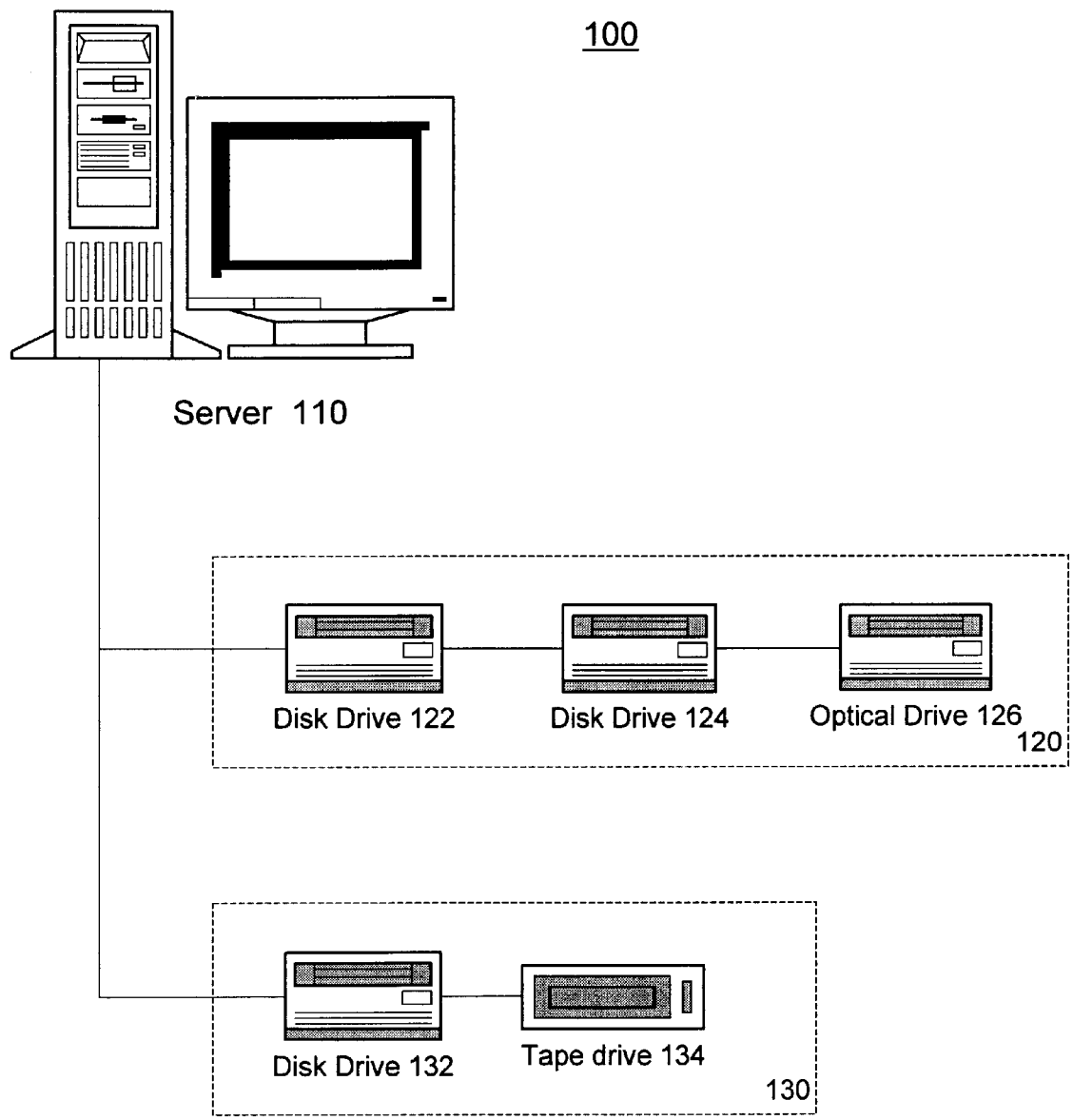
FIG. 1 shows an exemplary computer system according to an embodiment of the invention.

Referring to FIG. 1, exemplary computer system 100 includes server 110 which is coupled to various memory storage devices. The memory storage devices are coupled to server 110 by Small Computer System Interface (SCSI) chains 120 and 130. The memory storage devices include disk drives 122 and 124 and optical drive 126 in SCSI chain 120, and disk drive 132 and tape drive 134 in SCSI chain 130.

In one embodiment, computer system 100 is, for example, a Hewlett Packard Series 800 computer system running the HP-UX 9.04 type UNIX operating system. Such a computer system may function as a server for other computer systems. It is understood that other computer systems and other UNIX operating systems (e.g., the International Business Machines AIX operating system) may be used in accordance with the invention. Additionally, although the disk drives are connected to their respective computer systems in SCSI chains in the preferred embodiment, any appropriate connection means may be used in accordance with the invention. Further although computer system 100 includes server 110, computer system 100 may include any type of computer system, including, for example, mainframes, minicomputers, workstations and personal computer systems.

Exemplary computer system 100 operates under control of the optional Logical Volume Manager (LVM) subsystem of the HP-UX operating system. The LVM system enables system administrators to manage disk space in terms of volume groups and logical volumes rather than, or in addition to, fixed-sized disk sections. A volume group can include, for example, multiple physical volumes (physical disks) and/or multiple logical volumes (logical disks).

Specifically, the storage of a computer system configured according to the LVM system consists of groupings of disks initialized for LVM and organized into volume groups. A volume group might include one or many LVM disks, and an entire system may include one or several volume groups. Just as volume groups are groupings of one or more physical LVM disks, also called physical volumes, volume groups are also subdivided into virtual disks, called logical volumes.

A logical volume is a partition. As such, a logical volume is a distinct portion of a storage device that functions as though it were a physically separate unit. Logical volumes can encompass space on one or more physical volumes, span physical volumes, and/or represent only a portion of a physical volume. Like disk sections, logical volumes can hold file systems, swap areas, and raw data. Disk space in a volume group is apportioned by creating logical volumes. The size of a logical volume is determined by its number of extents, each being four megabytes by default, and is configurable. File systems and swap space are then assigned to the logical volumes within the volume group.

Typically, using basic UNIX commands, a logical volume can be created and extended to allocate sufficient space for a file system, user application, or raw data. New file systems may be mounted or applications installed on the logical volume. The same approach may be used when decreasing the capacity of a file system created on a logical volume.

The root volume group is a special volume group that includes the system boot disks, storage areas designated for containing specific data such as the root file system (/) logical volume and the file system containing /usr, storage areas with designated space for storing temporary data such as the primary swap logical volume and the file system containing /tmp. The root, swap and usr logical extents may be mapped to physical extents on the same physical disk or on different physical disks within the root volume group. Typically, the boot area is at a specific region on the same physical volume that contains the root logical volume.

The swap space is typically a space on a secondary storage device (such as a disk) that is allocated for memory swapping. For example, in a client/server environment, the server may store some client processes in the swap space while other client processes are being serviced. As such, the swap space has no intrinsic data. There is no file system corresponding to the swap logical volume as there is a /usr file system to correspond to the /usr logical volume.

The logical volume corresponding to the primary swap space can be located on any disk in the root volume group. The primary swap logical volume should be created with contiguous allocation of physical extents. Also, the size of the swap logical volume is typically predetermined.

Figure 2:
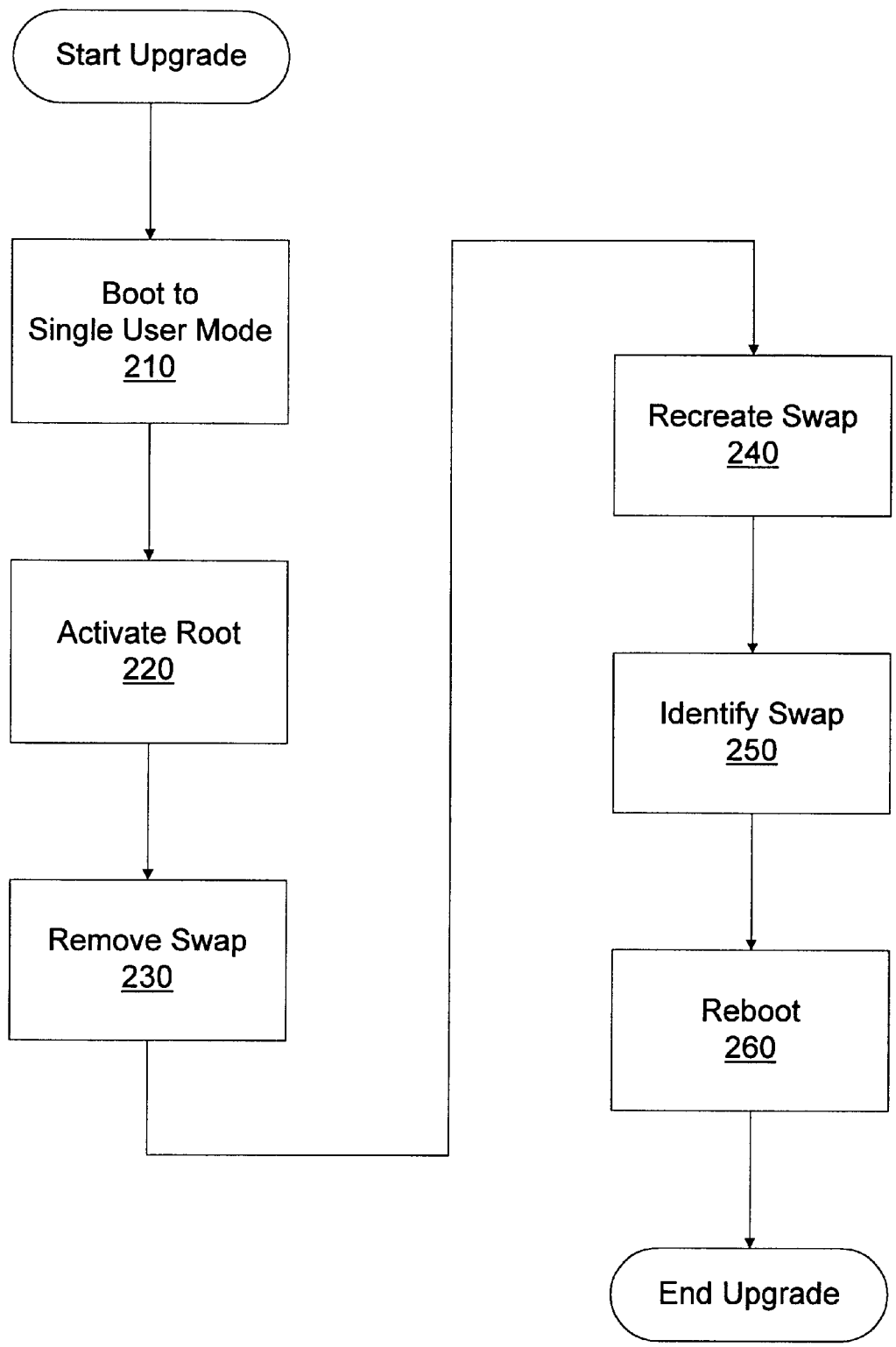
FIG. 2 shows a flow chart for decreasing the size of the swap space according to an embodiment of the invention.
Figure 3:
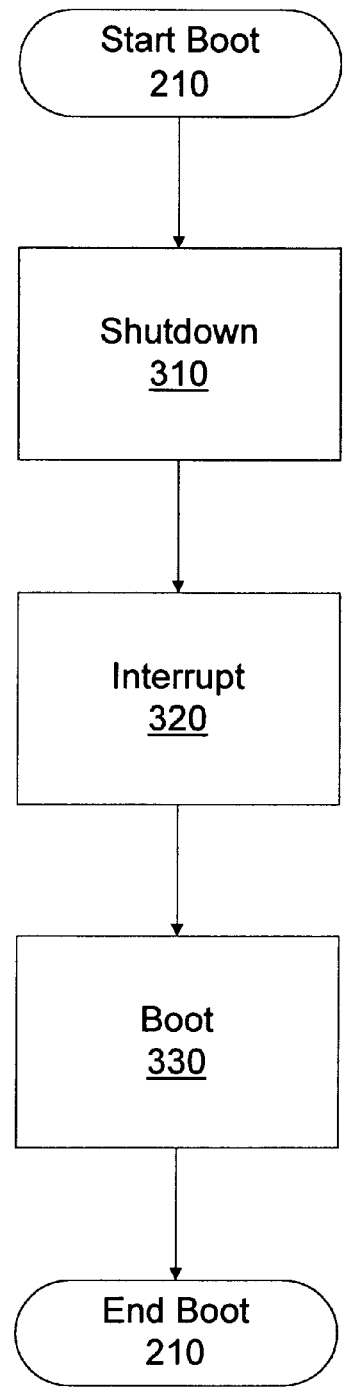
FIG. 3 shows a flow chart for booting the exemplary computer system of FIG. 1 according to an embodiment of the invention.

FIG. 2 shows a flow chart of the operation of an upgrade module for upgrading computer system 100 by increasing the size of the primary swap space without reinstalling the operating system on computer system 100. It is appreciated that the upgrade module and other modules discussed herein may consist of directly entered commands by a computer system user, or steps executed by a software module or a hardware module either directly on computer system 100 or remotely on computer system 100 from another computer system. At boot step 210, computer system 100 is rebooted and brought to single user mode. FIG. 3 shows a flow chart of the operation of a boot module for booting computer system 100 to single user mode according to boot step 220.

At shutdown step 310, computer system 100 is shutdown using the following command: /etc/shutdown -r.

Control then transitions to interrupt step 320. During interrupt step 320, the reboot of computer system 100 is interrupted. After computer system 100 performs its memory checks, computer system 100 provides an opportunity to interrupt the boot cycle. For example, computer system 100 prompts the user to "press any key to interrupt." Responsive to a boot process interrupt, computer system 100 displays a boot drive selection prompt such as "Boot from primary path?" prompt, to which the user responds "y". Computer system 100 next displays an "Interact with IPL [Initial Program Loader]?" prompt to which the user also responds "y".

Control then transitions to reboot step 330. During reboot step 330, computer system 100 is booted to single user mode. For example, the command hpux is a specific secondary system loader (SSL) utility for loading the operating system kernel. The exemplary boot command hpux -lm (;0)/hp-ux boots computer system 100. The -lm option indicates that computer system 100 is to be booted to LVM maintenance mode (i.e., brought to single user mode without activating any volume groups). The -lm option configures only the root volume group before initiating single user mode. The command line argument (;0) designates the default boot disk. The /hp-ux argument is the actual kernel file that computer system loads into memory. When computer system 100 is booted, the UNIX operating system has been installed into the memory of computer system 100. Computer system 100 is in single user mode and all volume groups are deactivated including the root volume group (which contains the swap space).

Referring again to FIG. 2, control transitions from boot step 210 to activate step 220. During activate step 220, the root volume group is activated, thereby making the alternative root volume group available for manipulation. The command vgchange -a y /dev/vg00 activates the root volume group (vg00). The -a y option activates the particular volume group named by the immediately following argument (/dev/vg00), and activates all associated physical volumes (e.g., disk drives) and logical volumes.

Control then transitions to remove swap step 230. During remove swap step 230, the swap logical volume is removed as a bootable device using the lvrmboot command and is removed using the lvremove command. The lvrmboot command removes the logical volume link to the indicated swap logical volume. For example, the command lvrmboot -s /dev/vg00/lvol2 updates all physical volumes contained in the volume group such that the logical volume /dev/vg00/lvol2 is removed as the root when the system is next booted on the volume group. The -s option indicates that the definition of the primary swap logical volume should be removed from the volume group. The lvremove command removes the indicated logical volume from its volume group. For example, the command:

lvremove /dev/vg00/lvol2 removes the swap logical volume (lvol2) from the root volume group (vg00). The swap logical volume may be safely removed because the swap space has no data within it.

Control then transitions to recreate swap step 240. During recreate swap step 240, the original swap logical volume is recreated at a smaller size. For example, the command lvcreate -d p -l <SIZE> -C y -r n -s y -M n -c n -n lvol2 /dev/vg00 creates a logical volume named lvol2 (option -n), having a desired size in logical extents which is indicated by the variable <SIZE> (option -l ), and located within root volume group vg00. The volume group vg00 must have at least <SIZE> extents for the swap space. The option -d p set the parallel scheduling policy. The option -C y sets the contiguous space requirement. The option -r n sets the no relocate option. The option -s y specifies that mirror copies cannot occupy the same disk. The option -M n turns off mirror write to the cache. The option -c n turns off mirror consistency recovery. The swap logical volume must be contiguous.

Control then transitions to identify swap step 250. During identify swap step 250, the recreated swap logical volume is re-identified to computer system 100 and the swap logical volume is reactivated. For example, the lvlnboot command is used to point computer system 100 to the swap logical volume:

lvlnboot -s /dev/vg00/lvol2

The vgchange command is used to activate the swap logical volume:

vgchange -a n /dev/vg00

The vgchange command activates the swap volume group (vg00). The -a y option activates the particular volume group named by the immediately following argument (/dev/vg00), and activates all associated physical volumes (e.g., disk drives) and logical volumes.

Control then transitions to reboot step 260. During reboot step 260, computer system 100 is rebooted to make the changes take effect. The command /etc/reboot initiates a reboot of computer system 100 so that computer system 100 may be restarted with the smaller root file system.

While the invention has been described with reference to various embodiments, it will be understood that these embodiments are illustrative and that the scope of the invention is not limited to them. Many variations, modifications, additions, and improvements of the embodiments described are possible.

For example, although the above commands may be entered into a computer system by a computer system user, the above commands may be included in a script, batch or executable file which can be stored on a machine-readable or computer-readable storage medium such as disk drive 132 or a CD-ROM. Furthermore, a computer system may be configured to execute the above commands on another computer system, thereby performing the upgrade without reinstalling the operating system on the other computer system. This embodiment is useful in a distributed computing environment.

Also, those skilled in the art will recognize that the UNIX commands and options of the preferred embodiment are exemplary and that other commands and options of the UNIX operating system or similar operating systems (such as the IBM AIX operating system) may be used in accordance with the invention. Modifications to the above series of commands will be apparent to those skilled in the art.

Additionally, those skilled in the art will recognize that although the functions of the above referenced modules are performed by user inputs or software modules in the present embodiment, other types of modules may be used such as application specific hardware modules and configured hardware modules. Also, the boundaries between modules are merely illustrative and alternative embodiments may merge modules or impose an alternate decomposition of functionality of modules. For example, a software module for booting the computer system to single user mode and a software module for rebooting the computer system after the primary swap size is increased may be merged into a single boot module. The merged boot module could be initiated with different parameters to boot to different modes. Alternatively, a reboot module for rebooting a computer system may be decomposed into modules to us perform the separate steps of the original reboot module. For example, the reboot module could be decomposed into a shutdown module, an interrupt module and a single user boot module. Moreover, alternative embodiments may combine multiple instances of a particular component.

These and other variations, modifications, additions, and improvements may fall within the scope of the invention as defined in the claims which follow.

What is claimed is:

1. In a computer system operating under control of a unix type operating system, the computer system including a first storage device, the first storage device including a primary swap space, the primary swap space having a first size, a method for decreasing the size of the primary swap space without reinstalling the operating system, the method comprising:

booting the computer system to a maintenance mode;

activating the first storage device as an active storage device of the computer system if the first storage device is not already an active storage device of the computer system;

deactivating the primary swap space having the first size; and activating the primary swap space at a second size smaller than the first size.

2. The method of claim 1 wherein the deactivating comprises:

declassifying the primary swap space as a bootable logical device of the computer system; and removing the primary swap space from the first storage device.

3. The method of claim 2 wherein the activating the primary swap space comprises creating a second primary swap space on the first storage device after removing the primary swap space from the first storage device, the second primary swap space having a size smaller than the first size.

4. The method of claim 1 further comprising rebooting the computer system after activating the swap space at the second size.

5. The method of claim 1, wherein the booting comprises:

shutting down the computer system by initiating a reboot of the computer system;

interrupting the reboot of the computer system; and selecting single user mode.

6. The method of claim 1, wherein the computer system further operates under control of a logical volume manager operating subsystem;

the computer system includes a root volume group, the root volume group including a first primary swap logical volume, the first primary swap logical volume including the primary swap space;

the method further includes activating the volume group after booting the computer system to single user mode and before deactivating the primary swap space;

the deactivating includes removing the first primary swap logical volume; and the activating the primary swap space includes creating a second primary swap logical volume on the root volume group, the second primary swap logical volume having a second size smaller than the first size; and identifying the second primary swap logical volume to the computer system as a logical volume including the primary swap space.

7. A first computer system configured to upgrade a second computer system operating under control of a UNIX type operating system, the second computer system including a first storage device, the first storage device including a primary swap space, the primary swap space having a first size, the first computer system comprising:

an upgrade module for decreasing the size of the primary swap space on the second computer system from the first size to a second size smaller than the first size without reinstalling the UNIX type operating system on the second computer system.

8. The first computer system of claim 7 wherein the upgrade module comprises:

a boot portion, the boot portion booting the second computer system to a maintenance mode;

a device activation portion, the activation portion activating the first storage device as an active storage device of the second computer system if the first storage device is not already an active storage device of the second computer system;

a resize portion, the resize portion including a deactivation portion, the deactivation portion deactivating the primary swap space; and a swap activation portion, the swap activation portion activating the primary swap space at the second size smaller than the first size.

9. The first computer system of claim 8 wherein the deactivation portion comprises:

a declassification portion, the declassification portion declassifying the primary swap space as a bootable logical device of the computer system; and a remove portion, the remove portion removing the primary swap space from the first storage device.

10. The first computer system of claim 9 wherein the swap activation portion creates a second primary swap space on the first storage device after the remove portion removes the primary swap space from the first storage device, the second primary swap space having a size smaller than the first size.

11. The first computer system of claim 8 further comprising a reboot portion, the reboot portion rebooting the second computer system after the swap activation portion activates the swap space at the second size.

12. The first computer system of claim 8, wherein the boot portion comprises:

a shutdown portion, the shutdown portion shutting down the computer system by initiating a reboot of the computer system;

an interrupt portion, the interrupt portion interrupting the reboot of the computer system; and a selection portion, the selection portion selecting single user mode.

13. The first computer system of claim 9, wherein the first storage device is a root volume group, the root volume group including a first primary swap logical volume, the first primary swap logical volume including the primary swap space;

the device activation portion activates the volume group after the boot portion boots the computer system to single user mode and before the deactivation portion deactivates the primary swap space;

the remove portion removes the first primary swap logical volume; and the swap activation portion includes
    a create portion, the create portion creating a second primary swap logical volume on the root volume group, the second primary swap logical volume having the second size smaller than the first size; and
    an identification portion, the identification portion identifying the second primary swap logical volume to the computer system as a logical volume including the primary swap space.

14. The first computer system of claim 8 wherein the first computer system is the same computer system as the second computer system.

15. An apparatus for decreasing the size of a primary swap space on a first computer system operating under control of a UNIX type operating system, the primary swap space having a first size, the apparatus comprising:

a computer-readable storage medium; and an upgrade module stored on the computer-readable storage medium, the upgrade module for upgrading the first computer system by decreasing the size of the primary swap space on the first computer system from the first size to a second size smaller than the first size without reinstalling the operating system, the upgrade module upgrading the first computer system responsive to being accessed by a second computer system.

16. The apparatus of claim 15, wherein the upgrade module comprises:

a boot portion, the boot portion for booting the first computer system to a maintenance mode;

a device activation portion, the activation portion for activating a first storage device as an active storage device of the first computer system if the first storage device is not already an active storage device of the first computer system;

a resize portion, the resize portion including
    a deactivation portion for deactivating the primary swap space; and
    a swap activation portion for activating the primary swap space at the second size smaller than the first size.

17. The apparatus of claim 16, wherein the swap activation portion comprises:

a create swap portion for creating a second primary swap logical volume on a root volume group, the second primary swap logical volume having the second size smaller than the first size; and a designation portion for designating the second primary swap logical volume to the first computer system as a logical volume including the primary swap space.

18. The apparatus of claim 16, wherein the deactivation portion comprises:

a declassification portion for declassifying the primary swap space as a bootable logical device of the computer system; and a removal portion for removing the primary swap space from the first storage device.

19. The apparatus of claim 16, wherein the boot portion comprises:

a shutdown portion for shutting down the first computer system by initiating a reboot of the first computer system;

an interrupt portion for interrupting the reboot of the first computer system; and a selection portion for selecting single user mode.

20. The apparatus of claim 16 further comprising a reboot module stored on the computer-readable storage medium, the reboot module for rebooting the first computer system after the swap activation portion activates the swap space at the second size.

21. The apparatus of claim 15, wherein the first computer system and the second computer system are the same computer system.

* * * * *